I. R. HICKS.
NUT LOCK.
APPLICATION FILED NOV. 9, 1912.

1,069,011. Patented July 29, 1913.

WITNESSES
L. H. Schmidt
Walton Harrison

INVENTOR
Irl R. Hicks,
BY Munn & Co.
ATTORNEYS

UNITED STATES PATENT OFFICE.

IRL ROBERT HICKS, OF HALLSVILLE, MISSOURI.

NUT-LOCK.

1,069,011.

Specification of Letters Patent.   Patented July 29, 1913.

Application filed November 9, 1912. Serial No. 730,444.

*To all whom it may concern:*

Be it known that I, IRL R. HICKS, a citizen of the United States, and a resident of Hallsville, in the county of Boone and State of Missouri, have invented certain new and useful Improvements in Nut-Locks, of which the following is a specification.

My invention relates to nut locks, my more particular purpose being to provide a simple and strong construction of nut lock in which the locking mechanism is not only self-tightening, but in case of the bolt stretching slightly, the parts will automatically assume their relative positions, thereby enabling the locking mechanism to obtain a new grip.

Reference is made to the accompanying drawings forming a part of this specification in which like letters indicate like parts.

Figure 1:
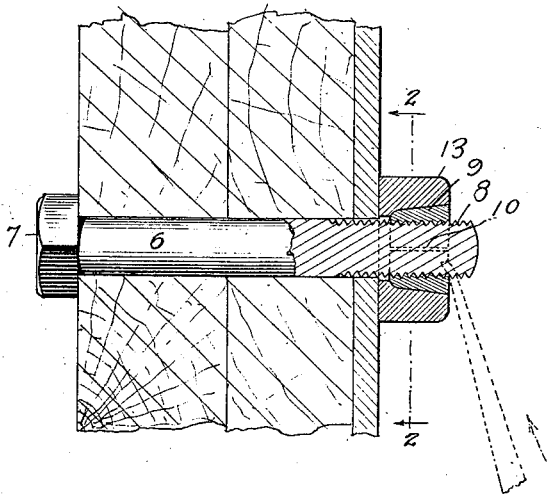
Figure 2:
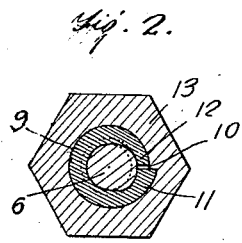
Figure 3:
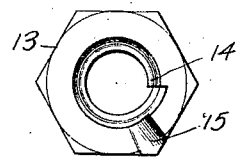
Figure 4:
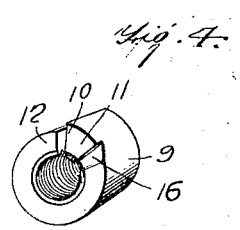
Figure 5:
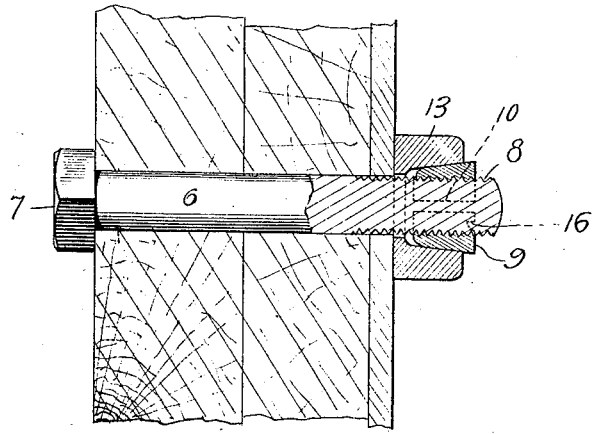

Figure 1 is a longitudinal section through a bolt provided with my improved nut lock. Fig. 2 is a cross section on the line 2—2 of Fig. 1; Fig. 3 is a front elevation or face view of the outer sleeve of the nut; Fig. 4 is a perspective showing the inner sleeve of the nut; and, Fig. 5 is a section showing how the nut is self-tightening to compensate for a slight stretching of the bolt.

A bolt is shown at 6 and is provided with an angular head 7 integral with it. The bolt is further provided with a threaded portion 8. Revolubly mounted upon this threaded portion is a sleeve 9 provided internally with a threaded portion mating the threaded portion 8 of the bolt. The sleeve 9 is a split sleeve, that is to say, is provided with a slot 10 extending in the general direction of the axis of the sleeve. The sleeve 9 is provided with a thick portion 11 and with a thin portion 12, these two portions being disposed upon opposite sides of the slot 10. The sleeve 9 varies uniformly in thickness from its edge 11 to its edge 12 as will be understood from Fig. 4.

At 13 is a sleeve separate from the sleeve 9 and forming together with the sleeve 9 a composite structure having the functions of a nut. The sleeve 13 is provided with a shoulder 14 disposed internally; that is to say, the opening in the sleeve 9 is slightly eccentric to the geometrical axis of the sleeve 13, the shoulder 14 being of proper size to compensate for the difference in thickness between the edges 11, 12 of the sleeve 9 when the parts are in normal position. The sleeve 13 is provided with a notch 15 and the sleeve 9 is provided with a notch 16, these notches being in registry when the sleeves are fitted together and tightened upon the bolt.

The operation of my device is as follows:—The sleeve 9 being mounted upon the threaded portion 8 of the bolt and being fitted loosely into the sleeve 13, a wrench is applied to the sleeve 13 and the sleeve is thus turned carrying with it the sleeve 9. As the shoulder 14 lodges against the edge 11 of the sleeve 9 the rotation of the sleeve 13 simply causes the sleeve 9 to turn. In this way, owing to the conical form of the sleeves 9 and 13, as shown in Fig. 5, the bolt is placed under tension and the sleeves 9 and 13 are tightened relatively to the bolt and to each other. Suppose now that an effort is made to turn the sleeve 13 backwardly—that is in such direction as to develop a tendency of unscrewing the parts. This movement of the sleeve 13 disconnects the shoulder 14 from the adjacent edge 11 of the sleeve 9, but owing to the shape of the inner surface of the sleeve 13 and of the outer surface of the sleeve 9 the various parts of the sleeve 9 are forced directly inward against the threaded surface of the bolt, and thus bind against the same, owing to the wedge-like action of the thread. The sleeve 9 is thereby tightened relatively to the bolt so that the sleeve 9 is unable to turn. This leaves the parts tightly locked together. It will be understood that when the rotation of the sleeve 13 is such as to force the sleeve 9 toward the head 7 of the bolt the parts are tightened together by virtue of the threads. When, however, the rotation of the sleeve 13 is in the contrary direction, the parts are tightened not by the thread but rather by the inward pressure due to the cam-like action of the sleeve 13 upon the sleeve 9. If, owing to shocks and jars, there is a tendency to turn the bolt in either of two directions or to turn the other parts in either of two directions, the parts become locked or tightened, as above described, it makes little or no difference whether the rotation of the sleeve 13 for the purpose of tightening the sleeve 9 be due to the application of a wrench or to accidental movements of the parts relatively to each other. Suppose now that the bolt 6 stretches slightly as indicated in Fig. 5. The sleeve 9 as a consequence moves slightly in relation to the sleeve 13 but as these two sleeves have previously been tight and slightly "sprung" relatively to each other, the slight stretching movement of the bolt 6 leaves the sleeves 9 and 13 still in contact with each other and that too under a moderate degree of pressure. If now the device be subjected to shocks or jars tending to turn the sleeve 13 in either of two directions, the sleeve 9 is clamped more tightly upon the bolt. In order to disengage the sleeves 9 and 13 from the bolt 6, a chisel or other appropriate tool is applied to the notches 15, 16 and driven, as for instance by hammer strokes, in the direction indicated by the arrow in Fig. 1. By thus turning both of the sleeves as a unit, they are readily loosened and may be removed by simply turning them further.

I do not limit myself to the precise construction shown as such variations may be made therein as fall within the scope of the appended claims.

I claim:—

1. In a nut lock, the combination of a split sleeve provided with a thick edge and a thin edge, said thick edge and said thin edge both extending substantially parallel with the axis of said sleeve, said sleeve varying gradually in thickness and also varying in external diameter from said thick edge to said thin edge, and being threaded internally to fit upon a threaded bolt, a second sleeve fitting upon the external portion of said first mentioned sleeve, and provided with a portion abutting said thick portion thereof in order to turn said first mentioned sleeve freely in one direction, and said second mentioned sleeve being provided with a surface for forcing said second mentioned sleeve radially inward when said second mentioned sleeve is turned in a direction opposite to said first mentioned direction, the outer surface of said split sleeve and the inner surface of said second sleeve being inclined relatively to the general longitudinal axis of said bolt.

2. In a nut lock, the combination of a split sleeve provided with a thick edge and a thin edge extending substantially parallel with the axis thereof, the external diameter of said sleeve varying gradually from said thick edge to said thin edge, and being threaded internally to fit upon a threaded bolt, a second sleeve fitting upon the external portion of said first mentioned sleeve, and provided with a portion abutting said thick portion thereof in order to turn said second mentioned sleeve freely in one direction, and said second mentioned sleeve being provided with an eccentric rim surface for forcing said second mentioned sleeve radially inward when said second mentioned sleeve is turned in a direction contrary to said first mentioned direction, the outer surface of said split sleeve and the inner surface of said second sleeve being inclined relatively to the general longitudinal axis of said bolt, said split sleeve and said second sleeve being provided with notches which may be brought into registry with each other.

IRL ROBERT HICKS.

Witnesses:
D. B. CARPENTER,
GLENN I. POLLARD.